(12) United States Patent
Varaprasad et al.

(10) Patent No.: US 8,409,663 B2
(45) Date of Patent: Apr. 2, 2013

(54) METHOD OF MAKING A COATED GLASS SUBSTRATE WITH HEAT TREATABLE ULTRAVIOLET BLOCKING CHARACTERISTICS

(75) Inventors: Desaraju V. Varaprasad, Ann Arbor, MI (US); John P. Hogan, Dearborn, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1014 days.

(21) Appl. No.: 11/790,813

(22) Filed: Apr. 27, 2007

(65) Prior Publication Data
US 2008/0268260 A1  Oct. 30, 2008

(51) Int. Cl.
B05D 5/00 (2006.01)
B05D 1/38 (2006.01)

(52) U.S. Cl. ............ 427/160; 427/165; 427/419.2; 427/419.3; 427/508

(58) Field of Classification Search ............ 427/160, 427/165, 402, 419.2, 419.3, 508
See application file for complete search history.

(56) References Cited

U.S. PATENT DOCUMENTS

| | | | | |
|---|---|---|---|---|
| 3,754,956 A | * | 8/1973 | Durrant et al. | 106/447 |
| 5,480,722 A | | 1/1996 | Tomonaga et al. | |
| 5,514,476 A | * | 5/1996 | Hartig et al. | 428/426 |
| 5,876,854 A | * | 3/1999 | Kawazu et al. | 428/428 |
| 6,277,485 B1 | * | 8/2001 | Invie et al. | 428/336 |
| 6,420,032 B1 | * | 7/2002 | Iacovangelo | 428/412 |
| 6,464,822 B1 | * | 10/2002 | Choi et al. | 156/307.1 |
| 6,576,349 B2 | | 6/2003 | Lingle et al. | |
| 6,740,211 B2 | * | 5/2004 | Thomsen et al. | 204/192.27 |
| 6,887,575 B2 | * | 5/2005 | Neuman et al. | 428/428 |
| 6,936,347 B2 | | 8/2005 | Laird et al. | |
| 6,942,924 B2 | * | 9/2005 | He et al. | 428/429 |
| 6,974,630 B1 | | 12/2005 | Stachowiak | |
| 7,081,302 B2 | | 7/2006 | Lemmer et al. | |
| 2002/0015851 A1 | * | 2/2002 | Higuchi et al. | 428/447 |
| 2002/0122962 A1 | | 9/2002 | Arfsten et al. | |
| 2005/0244658 A1 | * | 11/2005 | Bae et al. | 428/447 |

FOREIGN PATENT DOCUMENTS

| | | |
|---|---|---|
| EP | 0 811 583 | 12/1997 |
| JP | 05-345638 | 12/1993 |
| JP | 08143331 A * | 6/1996 |

* cited by examiner

*Primary Examiner* — Elena T Lightfoot
(74) *Attorney, Agent, or Firm* — Nixon & Vanderhye P.C.

(57) ABSTRACT

A method for making a heat treatable coated article including a composite oxide coating with ultraviolet (UV) radiation blocking properties is provided. The composite oxide coating may be formed by applying, then optionally curing, a wet coating solution including a mixture of titanium, ceria, and silica to the substrate over an optional infrared (IR) blocking multi-layer coating (e.g., low-E coating). The ceria, titania, and silica may act as UV blocker(s). An organic polymer top coating may be provided over the composite oxide, where the organic polymer may be formed by exposing a photomonomer and/or photopolymer to radiation (e.g., UV radiation). The coated glass substrate may then be subjected to a high temperature heat treatment step. The coating may be heat and/or crack resistant. The coated article may be effective at blocking IR and/or UV radiation in applications such as window applications.

9 Claims, 6 Drawing Sheets

METHOD OF MAKING A COATED GLASS SUBSTRATE WITH HEAT TREATABLE ULTRAVIOLET BLOCKING CHARACTERISTICS

Certain example embodiments of this invention relate to a coated glass substrate having an ultraviolet (UV) blocking coating which may be heat resistant and may be subjected to high temperatures such as those used during thermal tempering of glass. In certain example embodiments of this invention, a UV blocking layer(s) is formed on a glass substrate, and may or may not be provided over a multi-layer low-E (low emissivity) coating. Thus, in certain example instances, the overall coating is capable of blocking significant amounts of infrared (IR) and/or UV radiation.

BACKGROUND AND SUMMARY OF EXAMPLE EMBODIMENTS OF THE INVENTION

Heat resistant UV blocking coatings are known in the art. For example, see U.S. Pat. No. 5,480,722 and 2002/0122962A1.

Cerium oxide has been combined with silica or titania in an attempt to enhance the quality of the film layer. While the addition of silica may lower the refractive index of the coating, the addition of titania may further increase the index of refraction and may also enhance the UV blocking ability of the cerium oxide coating. When thin films of ceria-titania-silica are formed on glass substrates rainbow-like colours may be seen. The rainbow-like colours may be caused by interference of light caused, at least in part, by a large difference between refractive indices of substrate and coating.

In addition, such ceria-titania-silica coatings tend to be highly reflective, which may not be desired in window applications. In order to suppress these potentially undesired effects, multi-layer oxide coatings of varying index have been reported in literature. Application of multiple oxide layers, however, is generally not very attractive for commercial applications because of the complexity of manufacturing processes and associated higher yield losses.

The interference effects of high refractive index ceria-titania coatings may be minimized in some instances by increasing the coating thickness. Thicker coatings, however, tend to be not only undesirably yellow but also highly reflective. By increasing the content of low index silica, the refractive index of the ceria-titania-silica coatings may be sufficiently reduced and the reflection and interference effects of coating can be minimized.

Because the molar extinction coefficients of ceria and ceria-titania are not high enough in the UV region, however, the dilution effect caused by adding higher levels of silica typically requires thicker coatings to achieve adequate UV blocking. Generally, the thicker the coating, the more likely it is to develop micro cracks during heat treatment process.

Thus there may exist a need for heat treatable UV blocking coatings that comprise a single layer oxide coating of lower refractive index, which remain substantially crack-free after high temperature heat treatment and/or which are largely free of undesired optical effects and also are cost effective to manufacture.

In at least certain example embodiments of this invention, it may be an object to provide a method to produce heat treatable coatings of lower oxide compositions that can block UV radiation effectively without exhibiting undesired optical defects. In at least certain example embodiments of this invention, it may be an object to provide a method to produce thicker heat treatable coatings that remain substantially crack-free after high temperature heat treatment. In at least certain example embodiments of this invention, it is may be an object to provide a method that incorporates application of a heat resistant organic polymer over coating on the top of oxide-precursor base coating which pyrolyzes completely during heat treatment processes while facilitating formation of thicker substantially crack-free coatings.

The term "substantially crack-free" does not imply the absence of all cracks; rather, it means that to the extent that any cracks form in the coating during production, the cracks (if any) do not substantially interfere with the overall structure, function, and operation of the UV coating, either alone or in the layered stack.

In certain example embodiments of this invention, there exists a need in the art for more efficient coating capable of blocking significant amounts of UV or IR and UV radiation. In certain example embodiments, a heat resistant coating is provided that may be processed (e.g., thermally tempered) cost effectively with minimal steps.

In certain example embodiments of this invention, there is provided a method of making a coated article including a UV blocking coating, the method comprising: applying a first wet coating comprising titanium, cerium, and silicon on the glass substrate, and at least partially curing the first wet coating solution to form a UV blocking coating on the glass substrate, the UV blocking coating comprising a mixture of oxides of cerium, titanium, and silicon and having a refractive index (n) of from about 1.55 to 1.85.

In certain example embodiments of this invention, there is provided a method of making a coated article, the method comprising: optionally forming a low-E coating on a glass substrate, the low-E coating comprising at least one infrared (IR) reflecting layer located between at least first and second dielectric layers; applying a first wet coating comprising a silane and cerium on the glass substrate; at least partially curing the wet coating to form a UV blocking coating on the glass substrate, the UV blocking coating comprising a mixture of oxides of silicon and cerium, and optionally titanium; applying a second wet coating comprising a photomonomer and/or photopolymer on the glass substrate over the UV blocking coating; and curing the second wet coating though exposure to radiation.

In certain example embodiments of this invention, there is provided a coated article comprising: a glass substrate; a UV blocking coating provided on the glass substrate over at least the glass substrate for blocking at least some UV radiation passing through the coated article; and an organic polymer top coating provided on the glass substrate over at least the UV blocking coating, the organic polymer being formed by curing a photomonomer and/or photopolymer through exposure to radiation.

In certain example embodiments of this invention, there is provided a method of making a coated article, the method comprising: forming a low-E coating on a glass substrate, the low-E coating comprising at least one infrared (IR) reflecting layer located between at least first and second dielectric layers; applying a wet coating comprising at least one UV blocking oxide and/or at least one precursor of a UV blocking oxide on the glass substrate over the low-E coating; forming a UV blocking and IR blocking coating on the glass substrate; forming an organic polymer top coating on the glass substrate; and subjecting the coated glass substrate to a heat treatment process including temperatures of at least about 400 degrees C.

DETAILED DESCRIPTION OF EXAMPLE EMBODIMENTS OF THE INVENTION

In certain example embodiments of this invention, coated articles are provided that block significant amounts of UV radiation, either alone or in combination with IR radiation. Such coated articles may be used in the context of windows such as architectural windows, heat strengthened windows, tempered windows, IG window units, vehicle windows, and/or the like.

In certain example embodiments of this invention, a UV blocking coating 35 and a organic polymer top coating 40 may optionally be provided on a glass substrate over a heat treatable low-E (low emissivity) coating 30.

Figures 6, 7:
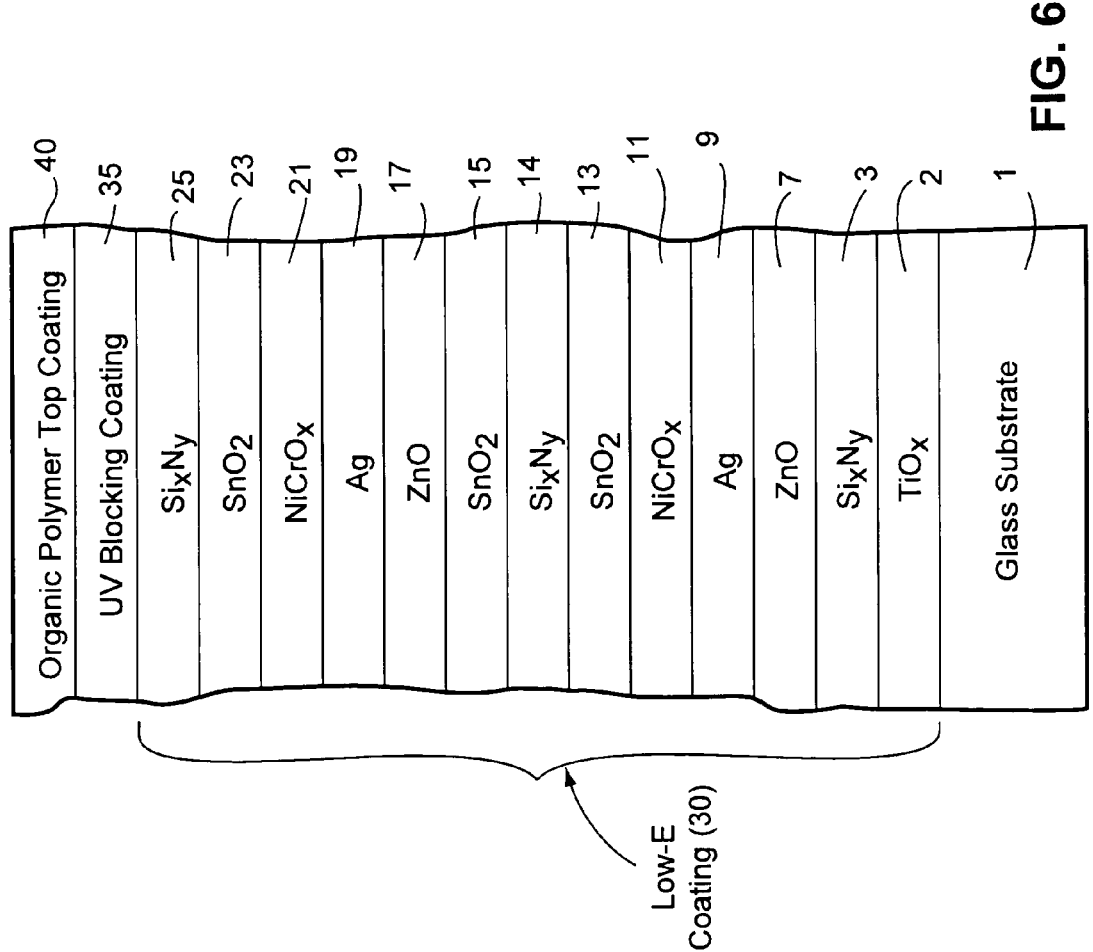
FIG. 6 is a cross sectional view of a coated article according to an example embodiment of this invention, illustrating the provision of a UV blocking on a glass substrate over a low-E coating.
FIG. 7 is a cross sectional view of a coated article according to an example embodiment of this invention, illustrating the provision of a UV blocking on a glass substrate over a low-E coating.

Referring to FIG. 7, the UV blocking coating 35 is then formed on the glass substrate 1, either directly on the glass substrate 1 or possibly over another layer or coating such as an optional low-E coating 30, by spin-coating or in any other suitable manner. In certain example embodiments of this invention, the UV blocking coating 35 may be from about 0.05 to 1.5 μm thick, more preferably from about 0.75 to 1.2 μm thick, and most preferably from about 0.9 to 1.0 μm thick. The UV blocking coating 35 may be of or include a mixture of one or more oxides of titanium, cerium, and silicon in certain example embodiments of this invention.

The organic polymer top coating 40 is then formed on the glass substrate 1 over the UV blocking coating 35, directly or indirectly. In certain embodiments of the present invention, the organic polymer top coating 40 comprises a photomonomer and/or photopolymer that has been exposed preferably to UV radiation. The photomonomer and/or photopolymer may be deposited in any suitable manner, for example, by spin-coating. In certain embodiments, roller-coating and spray-coating are preferred manufacturing processes.

The term "photomonomer" should be understood to mean a radiation curable monomer, which also include further polymerizable oligomers and polymers. Rapid curing of such a monomer may result, for example, from any stimulus that generates free radicals and ions. For example, free radical initiation can be effectively provided by a source of UV light or electron beams. The photomonomer and/or photopolymer may basically comprise a polyester, acrylic, polyurethane or any of a number of general groups generally known to those skilled in the art. For example, the photomonomer and/or photopolymer may comprise UV-curable epoxies and/or UV-curable acrylates, such as, for example, commercially available UV-curable epoxies and/or UV-curable acrylates, including those available from Redspot, Vantec, Tangent, Dymax, Loctite, etc. In certain example embodiments of this invention, the organic polymer top coating 40 may be from about 5 to 10 μm thick, more preferably from about 6 to 9 μm thick, and most preferably from about 7 to 8 μm thick.

In certain embodiments of the present invention, the organic polymer top coating 40 comprises a thermal-cured polymer, such as Bani-M, a polyimide precursor available from Maruzen Petrochemical Co., dissolved in MEK (methyl ethyl ketone) as well as P-84, a polyimide available from HP Polymers Inc., dissolved in NMP (N-methyl pyrrolidone) solvent as top coats. In other embodiments, other soluble polymers, such as PMMA, PVB, etc., are also contemplated. In yet further embodiments, other heat cure polymer systems such as epoxy resins cured by amines, imidazoles, etc. are also contemplated as organic top coating 40.

In certain example embodiments of this invention, the UV blocking coating 35 may be formed as follows. A liquid coating solution (for a UV blocking coating that blocks significant amounts of UV radiation) is prepared by forming a coating sol comprising titania, ceria, and silica. The coating sol is then deposited on a substrate (such as a glass substrate) via any suitable method, such as spin coating. The coating sol is then cured in a single-step or multiple-step process using heat from a hot plate and/or oven.

In certain example embodiments, titanium alkoxides as metal organic compounds may be used as the source of titania in the coating sol. Titanium alkoxides include, for example, titanium tetramethoxide, titanium tetraethoxide, titanium isopropoxide, titanium n-propoxide, titanium tetra n-butoxide, titanium tetraisobutoxide, titanium methoxypropoxide, and titanium dichloride diethoxide. The titanium alkoxide sol may be at least partially pre-hydrolyzed in certain example instances. In certain example embodiments, the mole percentage of titania in the coating sol may include from about 1-40% titania, more preferably from about 10-35% titania, more preferably from about 13-25% titania, and most preferably from about 20-25% titania. Optionally, titanium oxalate and/or nitrate may be used as a metal organic compound as a starting material for the titania sol.

In certain embodiments, cerium nitrates, cerium chloride, cerium ethylhexanoate, and/or ceric ammonium nitrate may be used as the source of ceria in the coating sol, although other, known types of cerium-containing compounds and materials may instead be used. In certain example embodiments, the mole percentage of ceria in the coating sol may include from about 1-40% ceria, more preferably from about 10-35% ceria, more preferably from about 13-25% ceria, and most preferably from about 20-25% ceria.

In certain embodiments, a silane and/or a silica (such as a colloidal silica) may be used as the source of silica in the coating sol, although other, known types of silicon-containing compounds and materials may instead be used. In certain embodiments, for example, the source of silica may comprise any silane containing at least one hydrolysable alkoxides functionality, such as TEOS (tetraethyl orthosilicate), MTS (methyl triethoxy silane), gamma-aminopropyl triethoxy silane etc. (available from Aldrich and Gilest). In certain embodiments, glycidoxypropyl trimethoxysilane (GLYMO) and/or colloidal silica (e.g., colloidal silica in methyl ethyl ketone supplied by Nissan Chemicals Inc.) are suitable. In certain example embodiments, the mole percentage of silica in the coating sol may include from about 20-99% silica, more preferably from about 30-80% silica, more preferably from about 35-70% silica, and most preferably from about 50-60% silica.

In certain embodiments, the coating sol comprising titania, ceria, and silica may be stabilized by at least one additive. An alcohol may be used as a solvent in the wet coating solution in certain example instances. Examples of compounds that may be used as stabilizer additives include glycols, alcohols (including, for example, alcohols having high boiling points, methanol, ethanol, propanols, etc.), polyols, beta-diketones, amines, amino alcohols and acetic acid esters. Examples of additives that may be used as a stabilizer in the wet coating solution include mono and dialkyl ethers of ethylene glycol and/or propylene glycol, acetyl acetone, acetoacetic acid, cyanoethylacetate, ethylacetoacetate, polyethylene glycols, caprolactone polyols, acrylic polyols, triethanol amine, methyl diethanol amine, and EDTA. One suitable additive is Tonepolyol 0210 available from the Dow Chemical Co. Suitable polyols are also available from Solvay.

In certain embodiments, the coating sol comprising titania, ceria, and silica may further comprise water and an acid. The acid may assist in initiating any reactions. Suitable acids include strong and/or weak acids, such as acetic acid, hydrochloric acid, sulfuric acids, and other known acids.

The coating sol may then be applied (e.g., via spin coating) on a glass substrate, optionally over a low-E coating 30. The coating is initially cured on a hot plate for a period of time at a temperature of from about 80-200 degrees C. (e.g., about 130 degrees C.) for about 3-10 minutes (e.g., about 5 minutes), and may then be heated in an oven at from about 150-300 degrees C. (e.g., at about 250 degrees C.) for from about 3-10 minutes (e.g., about 5 minutes) for curing the UV blocking coating. The UV blocking coating 35 was thus made up of a mixture of oxides of silicon, cerium, and titanium (e.g., $SiO_2/CeO_2/TiO_2$) in this example embodiment.

The photomonomer and/or photopolymer may then be applied (e.g., via spin coating) on the UV blocking coating 35. The organic polymer top coating 40 may then be formed by exposing the photomonomer and/or photopolymer to radiation, such as UV radiation.

The coated article may then be thermally tempered in a tempering furnace at a temperature of at least about 400 degrees C., more preferably at least about 625 degrees C. for a period of time sufficient to thermally temper the glass substrate 1 (e.g., about 5 minutes). Thus, in certain embodiments, the result may be a thermally tempered coated article including the low-E coating 30 provided on the glass substrate 1 for blocking significant amounts of IR radiation (if coating 30 is present), the UV coating 35 provided on the glass substrate 1 for blocking significant amounts of UV radiation, and the organic polymer top coating 40 provided on the glass substrate 1 for assisting in the improvement of physical characteristics of the article (e.g., see FIGS. 6-7).

In other example embodiments, the UV blocking coating 35 may be made of or include a mixture of oxides of cerium and silicon (e.g., $CeO_2/SiO_2$), a mixture of oxides of titanium and silicon (e.g., $TiO_2/SiO_2$), and/or a mixture of oxides of cerium and titanium (e.g., $CeO_2/TiO_2$). In other exemplary embodiments, a coating sol for a UV blocking coating 35 that blocks significant amounts of UV radiation may comprise any combination known to have UV blocking characteristics. For example, the UV blocking coating 35 may comprise at least one metal oxide from the group consisting of ceria, titania, zinc oxide, bismuth oxide, tin oxide and antimony oxide, and/or a precursor of at least one of these metal oxides The coated article (e.g., comprising the glass substrate, optionally the low-E coating, the UV blocking coating, and the organic polymer top coating) may be used in various applications.

Also, the coating 35, 40 may have a refractive index ranging from about 1.55 to 1.85, more preferably from about 1.6 to 1.8, and most preferably from about 1.65 to 1.75 in certain example embodiments of this invention. Such refractive index values have been found to be advantageous for antireflection purposes.

The following examples of different embodiments of this invention are provided for purposes of example and understanding only, and are not intended to be limiting unless expressly claimed.

EXAMPLES

Coating sols were prepared by mixing cerium(III) nitrate hexahydrate (available from Sigma-Aldrich), titanium tetrabutoxide and glycidoxypropyl trimethoxysilane (GLYMO) in mole proportions listed in the Table 1 in n-propanol containing about 20% by weight of acetic acid. About 4 times excess moles of water was added to initiate reactions. About 5-10% by weight of Tonepolyol 0210 (available from the Dow Chemical Co.) was also added to all the coating sols. Base coatings of ceria, titania and silica precursors were formed on soda lime glass substrates by the spin coating method. Coatings on glass substrates were initially cured on a hot plate at about 130° C. for about 5 minutes, followed by heating in an oven at about 250° C. for about 5 minutes. A UV curable monomer composition was applied to all the glass substrates coated with the base coatings. UV curable monomer composition was a mixture of 96 wt % of Cyracure UVR-6107, a cycloaliphatic epoxide resin obtained from Dow and 4 wt % of Cyracure UVI-6976, a cationic photoinitiator obtained from Dow. An organic polymer top coating was formed by exposing the UV curable monomer composition on all the base coatings listed in Table 1. Coated glass substrates having both the base coating and the top coating were fired in a box furnace at about 625° C. for about 5 minutes. Optical performance of the ceria-titania-silica coatings and the data is shown in Tables 1 to 3 and in FIGS. 1-5.

TABLE 1

| | Mole % Composition of Silica, Ceria and Titania (base coat) | | | | | | |
|---|---|---|---|---|---|---|---|
| Coating No. | $SiO_2$ mole % | $CeO_2$ mole % | $TiO_2$ mole % | RPM/Time (s) | Base Coat Thickness (μm) | Top Coat Thickness (μm) | Base Coat Refractive Index |
| 1 | 72.8% | 13.5% | 13.5% | 1200/20 | 1.00 | 8 | 1.58 |
| 2 | 66.6% | 16.5% | 16.5% | 1200/20 | 1.00 | 7 | 1.60 |
| 3 | 59.4% | 20.5% | 20.5% | 900/20 | 1.15 | 7.5 | 1.66 |
| 4 | 59.4% | 20.5% | 20.5% | 1000/20 | 1.00 | 7 | 1.66 |
| 5 | 59.4% | 20.5% | 20.5% | 1200/20 | 0.91 | 7 | 1.66 |
| 6 | 52.1% | 24.0% | 24.0% | 1000/20 | 0.89 | 8 | 1.76 |

TABLE 1-continued

Mole % Composition of Silica, Ceria and Titania (base coat)

| Coating No. | SiO$_2$ mole % | CeO$_2$ mole % | TiO$_2$ mole % | RPM/Time (s) | Base Coat Thickness (μm) | Top Coat Thickness (μm) | Base Coat Refractive Index |
|---|---|---|---|---|---|---|---|
| 7 | 52.1% | 24.0% | 24.0% | 900/20 | 0.96 | 7.5 | 1.76 |
| 8 | 37.2% | 31.4% | 31.4% | 900/20 | 0.76 | 7.5 | 1.96 |

TABLE 2

Optical Performance (Transmission) of Silica, Ceria and Titania

| Coating No. | SiO$_2$ mole % | % T$_{uv}$ | % T$_{vis}$ | L* | a* | b* | T$_{dw}$ |
|---|---|---|---|---|---|---|---|
| 1 | 72.8% | 14.17 | 86.59 | 94.56 | −1.50 | 3.88 | 63.49 |
| 2 | 66.6% | 10.26 | 87.82 | 95.08 | −1.71 | 3.69 | 62.66 |
| 3 | 59.4% | 4.94 | 88.60 | 95.41 | −2.41 | 4.45 | 59.70 |
| 4 | 59.4% | 5.58 | 87.53 | 94.96 | −2.37 | 4.49 | 59.39 |
| 5 | 59.4% | 7.09 | 88.86 | 95.52 | −2.10 | 3.54 | 61.82 |
| 6 | 52.1% | 4.00 | 87.49 | 94.94 | −2.55 | 4.67 | 58.14 |
| 7 | 52.1% | 2.97 | 85.95 | 94.29 | −3.15 | 5.51 | 55.80 |
| 8 | 37.2% | 1.63 | 84.24 | 93.56 | −2.74 | 7.76 | 51.75 |

TABLE 3

Optical Performance (Reflectance) of Silica, Ceria and Titania

| Coating No. | SiO$_2$ mole % | Glass side | | | | Film side | | | |
|---|---|---|---|---|---|---|---|---|---|
| | | % R | L* | a* | b* | % R | L* | a* | b* |
| 1 | 72.8% | 8.67 | 35.35 | −0.54 | −0.56 | 8.72 | 35.44 | −0.49 | −0.72 |
| 2 | 66.6% | 9.41 | 36.76 | −1.09 | 0.23 | 9.45 | 36.84 | −0.86 | −0.16 |
| 3 | 59.4% | 9.44 | 36.82 | −1.41 | 0.13 | 9.48 | 36.9 | −0.96 | −0.57 |
| 4 | 59.4% | 9.95 | 37.74 | −0.97 | −0.62 | 10.03 | 37.89 | −0.39 | −1.51 |
| 5 | 59.4% | 9.51 | 36.94 | −1.2 | 1.04 | 9.54 | 37 | −0.93 | 0.69 |
| 6 | 52.1% | 10.11 | 38.04 | −2.06 | 1.95 | 10.37 | 38.51 | −1.86 | 0.91 |
| 7 | 52.1% | 10.59 | 38.88 | −0.53 | 1.38 | 10.78 | 39.21 | 0.41 | −0.27 |
| 8 | 37.2% | 12.11 | 41.39 | −5.46 | 0.1 | 12.29 | 41.67 | −4.38 | −1.96 |

Refractive indices at 550 nm of the ceria-titania-silica coatings decreased with increasing silica concentration. In FIGS. 1-5, all the coatings contained silica which was derived from GLYMO except the coating that was labeled as 37.2% SiO$_2$C which contained 1:1 mole ratio of colloidal silica (Nissan's IPA-ST) and GLYMO.

Figure 1:
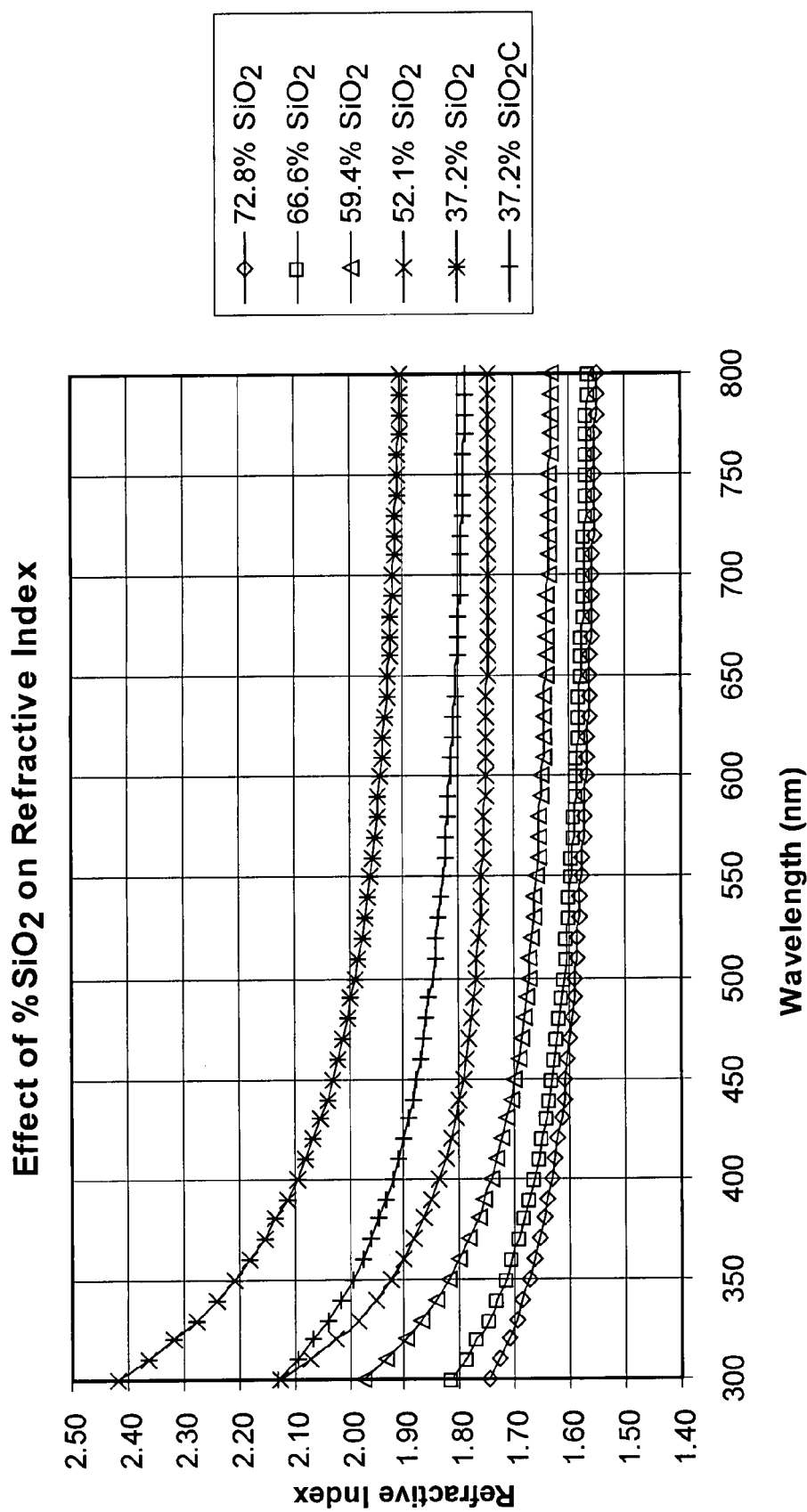
FIG. 1 is a refractive index vs. wavelength graph illustrating the effect of % $SiO_2$ on refractive index in accordance exemplary embodiments.
Figure 2:
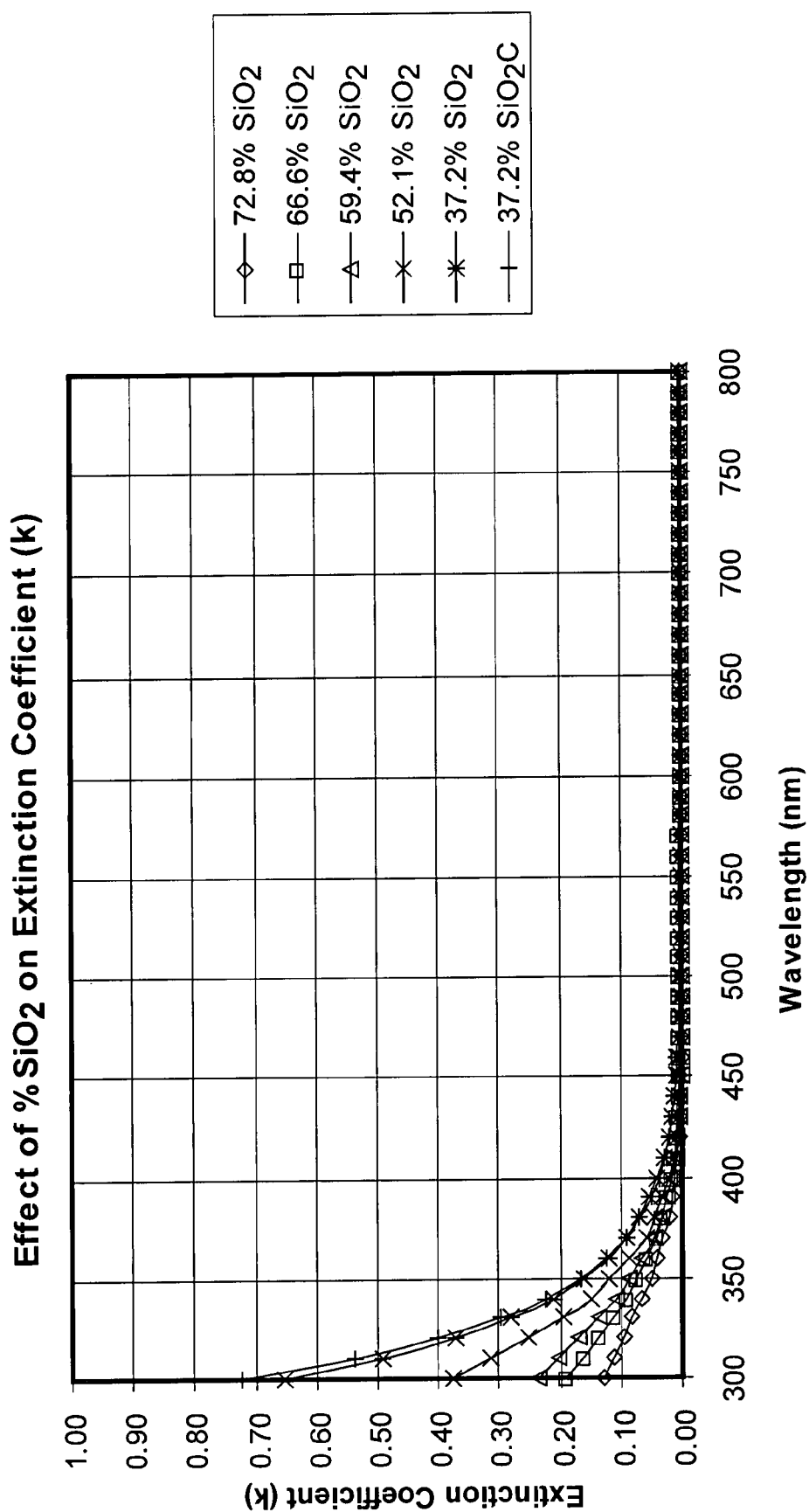
FIG. 2 is a extinction coefficient vs. wavelength graph illustrating the effect of % SiO$_2$ on extinction coefficient in accordance exemplary embodiments.
Figure 3:
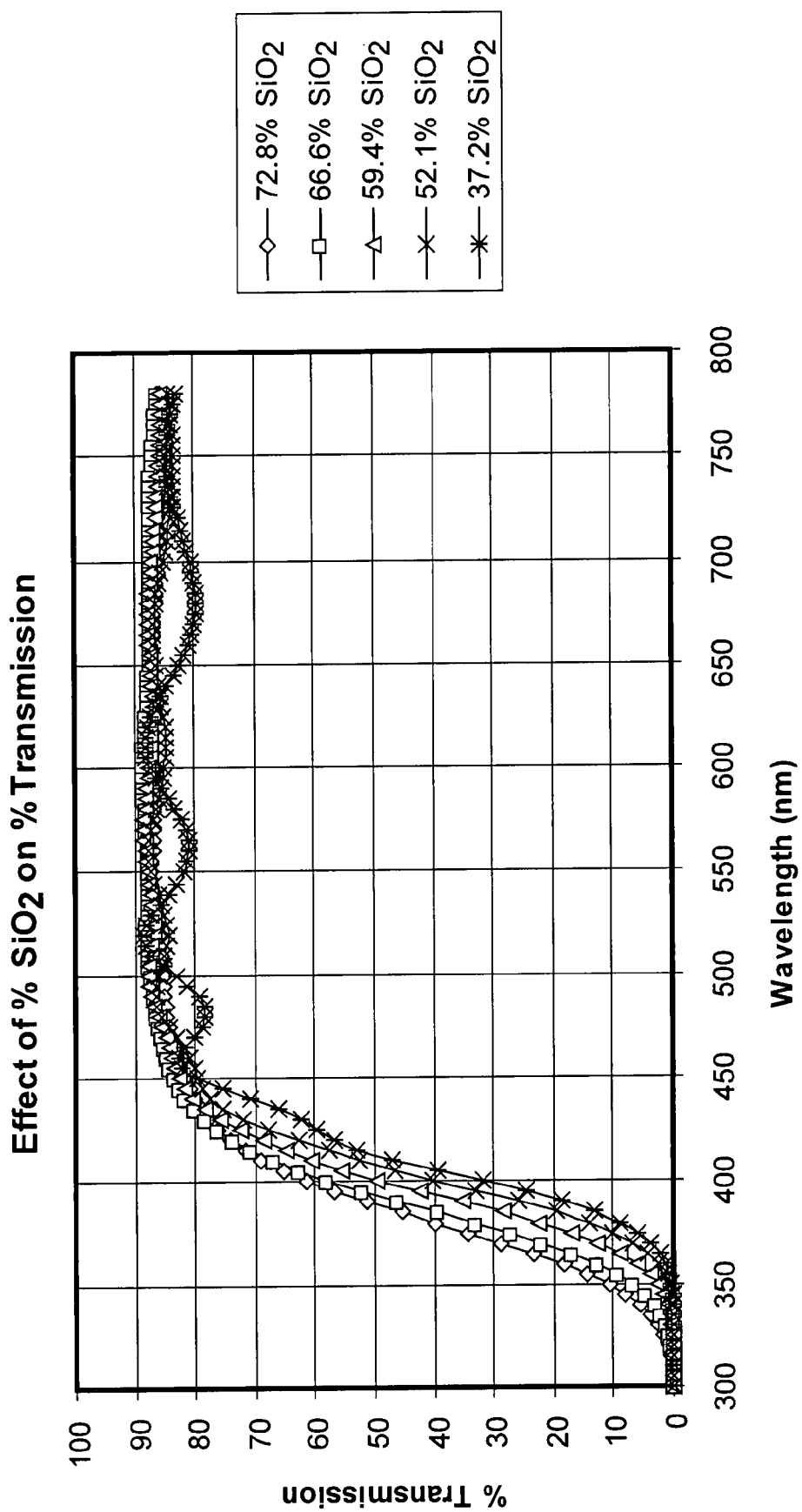
FIG. 3 is a transmission (% T) vs. wavelength graph illustrating the effect of % SiO$_2$ on transmission (% T) in accordance exemplary embodiments.
Figure 4:
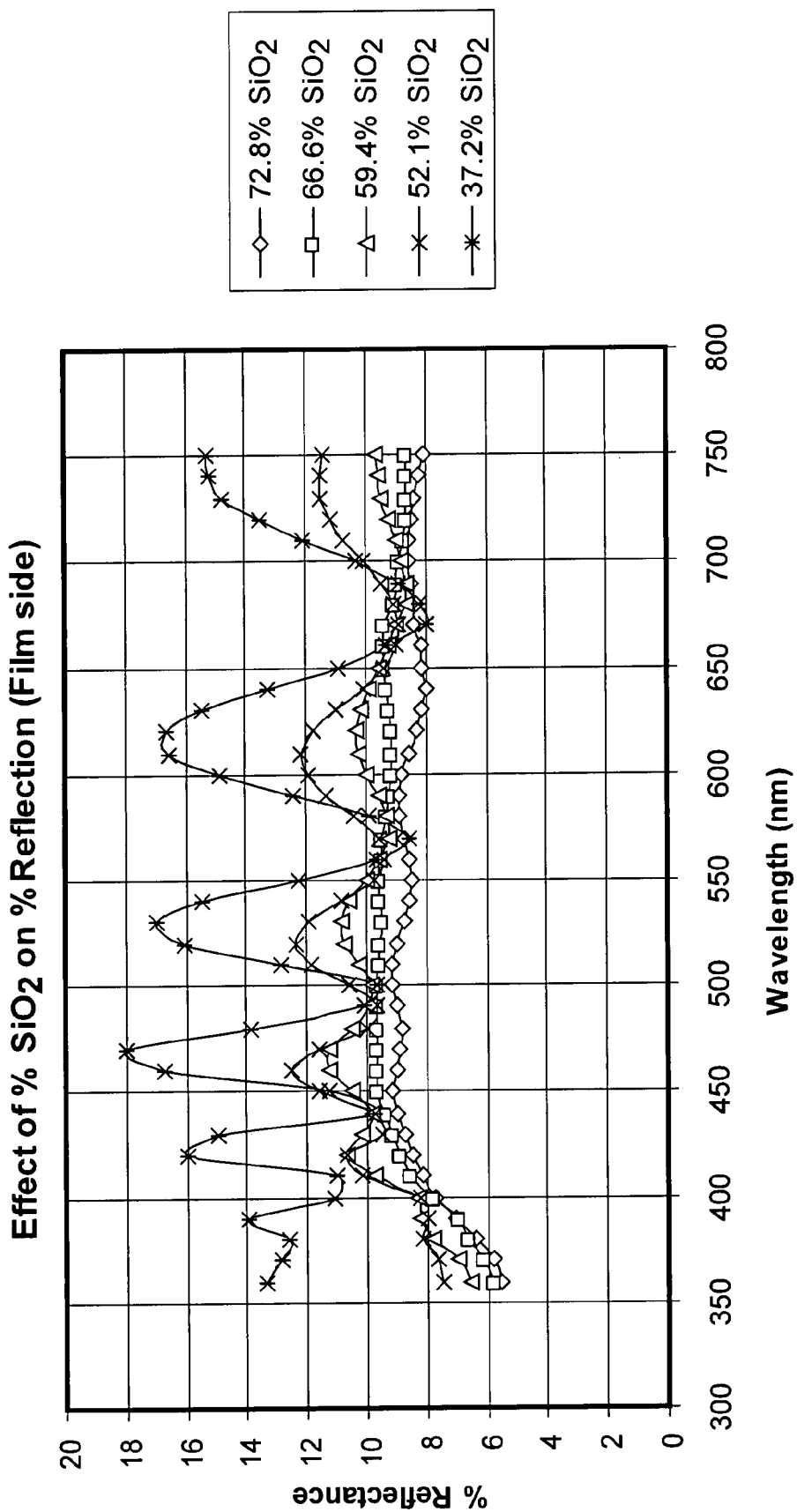
FIG. 4 is a % reflectance vs. wavelength graph illustrating the effect of % SiO$_2$ on reflectance (film side) in accordance exemplary embodiments.
Figure 5:
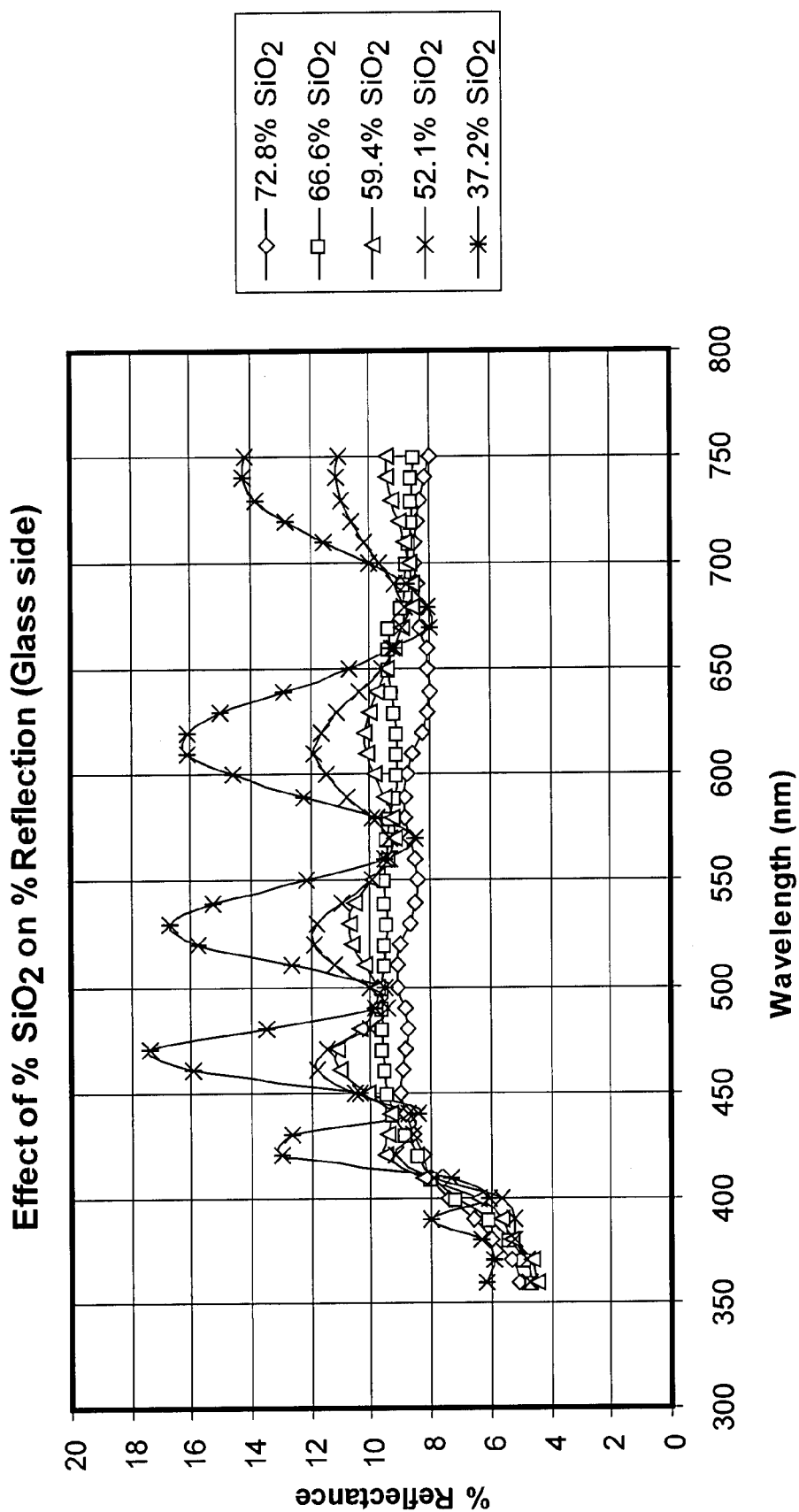
FIG. 5 is a % reflectance vs. wavelength graph illustrating the effect of % SiO$_2$ on reflectance (glass side) in accordance exemplary embodiments.

The figures demonstrate the effect of increasing silica content on optical properties of ceria-titania coatings of equimolar composition. As shown in Table 1, columns 3 & 4, the ceria and titania concentrations were kept equal to each other in all coatings while the concentration of silica is varied. FIG. 1 shows that as the concentration of silica increased the refractive index of coating decreased and data at 550 nm is shown in Table 1, last column. FIG. 2 shows that the molar extinction coefficient of coatings in the UV region decreased with increasing concentration of silica due to the effect of dilution of ceria-titania complex chromophore. This is manifested in the form of higher % T$_{uv}$ in the region 300-380 nm, which is a measure for UV blocking efficiency, for coatings having comparable thickness as shown in Table 2. Base coat thickness data is shown in Table 1. FIG. 3 demonstrates the same effect that the wavelength at which UV radiation is blocked (lowering of transmission) moved towards lower wavelengths as the concentration of silica increased. In addition, it also demonstrates that the interference effects in the visible region of spectrum could be minimized by increasing silica concentration in the ceria-titania-silica coatings. FIGS. 4 and 5 show that the film side and glass side reflection of coated glass substrates decreased with increasing concentration of silica in coating and the data is shown Table 3. As a result of this, the % T$_{vis}$ of the coatings increased with increasing concentration of silica.

The low-E coating is optional in certain example embodiments of this invention. A low-E coating typically includes at least one infrared (IR) blocking layer of or including a material such as silver or gold for blocking significant amounts of IR radiation, where the IR blocking layer is located between at least first and second dielectric layers. Example materials of the dielectric layers include silicon nitride, tin oxide, zinc oxide and so forth, including other art-recognized materials such as other metal oxides. Any suitable low-E coating 30 may be used, and the example low-E coatings discussed herein are provided for purposes of example only. The combination of coatings 30, 35, and 40 on the glass substrate permits the coated article to block significant amounts of both UV and IR radiation which may have been heretofore difficult to achieve. Low-E coatings, while able to block significant amounts of IR radiation, are typically deficient when it comes to blocking UV radiation. Example optional low-E coatings 30 which may be used in different embodiments of this invention are described, for purposes of example and without limitation, in the following U.S. Patent documents the disclosures of all of which are hereby incorporated herein by reference: U.S. Pat. Nos. 7,081,302, 6,936,347, 6,974,630, 6,967,060, 6,942,923, 6,887,575, 3,382,528, 6,576,349, 6,926,967, 6,916,408, 6,632,491, and 6,863,928.

FIG. 6 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and optional low-E coating (or layer system) 30 provided on the substrate 1 either directly or indirectly. The low-E coating 30 includes: bottom dielectric layer 2 which may be of or include titanium oxide (e.g., TiO$_2$) or the like, dielectric silicon nitride layer 3 which may be Si$_3$N$_4$, of the Si-rich type for haze reduction, or of any other suitable stoichiometry in different embodiments of this invention, first lower contact layer 7 (which contacts IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention), another silicon nitride layer 14, tin oxide inclusive interlayer 15, second lower contact layer 17 (which contacts IR reflecting layer 19), second conductive and preferably metallic IR reflecting layer 19, second upper contact layer 21 (which contacts layer 19), dielectric layer 23, and finally protective dielectric layer 25 at the interface with the overlying UV blocking coating 35. The "contact" layers 7, 11, 17 and 21 each contact at least one IR reflecting layer (e.g., layer based on Ag). The aforesaid layers 2-25 make up low-E (i.e., low emissivity) coating 30 which is provided on glass or plastic substrate 1. The UV blocking coating 35 is provided on the glass substrate 1 over at least the low-E coating 30. The organic polymer top coating 40 is provided on the glass substrate 1 over at least the UV blocking coating 35.

Dielectric layer 2 is in direct contact with the glass substrate 1, and is optional. Dielectric layer 2 may be of or include $TiO_x$ in certain example embodiments of this invention, where x is from 1.5 to 2.0, more preferably about 2.0. Dielectric layers 3 and 14 may be of or include silicon nitride or other suitable material in certain embodiments of this invention. Any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in certain embodiments of this invention. Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention. The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. Dielectric layer 13 may be of or include tin oxide in certain example embodiments of this invention. However, as with other layers herein, other materials may be used in different instances. Lower contact layers 7 and/or 17 in certain embodiments of this invention are of or include zinc oxide (e.g., ZnO). The zinc oxide of layers 7 and 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 1 to 4% Al. Interlayer 15 of or including tin oxide or other suitable material is provided under IR reflecting layer 19 so as to be located between silicon nitride layer 14 and zinc oxide layer 17. Dielectric layer 23 may be of or include tin oxide or other suitable material in certain example embodiments of this invention. Dielectric layer 25, which may be an overcoat in certain example instances, may be of or include silicon nitride (e.g., $Si_3N_4$) or any other suitable material in certain example embodiments of this invention. Other layer(s) below or above the illustrated coating may also be provided. Thus, while the layer system or coating is "on" or "supported by" substrate 1 (directly or indirectly), other layer(s) may be provided therebetween. Thus, for example, the coatings of FIG. 6 may be considered "on" or "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. The layers of the low-E coating 30 may be formed on the glass substrate by sputtering or any other suitable technique.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of making a coated article including a UV blocking coating, the method comprising:
    applying a first wet coating solution comprising a mixture of compounds of titanium, cerium, and silicon on a glass substrate,
    at least partially curing the first wet coating solution to form a UV blocking coating on the glass substrate, the UV blocking coating comprising a mixture of oxides of cerium, titanium, and silicon, the UV blocking coating consisting essentially of:
    titanium oxide: from about 20-25% by mole
    cerium oxide: from about 20-25% by mole
    silicon oxide: from about 30-60% by mole,
    wherein the UV blocking coating has a refractive index (n) of from about 1.66 to 1.96, and wherein the UV blocking coating has a thickness ranging from about 0.75 to 1.2 μm, and wherein the UV transmission of the UV blocking coating is no greater than about 10%;
    applying a second wet coating comprising a photomonomer and/or photopolymer on the glass substrate over the UV blocking coating;
    curing the second wet coating through exposure to radiation, wherein the second wet coating has a thickness of from about 5 to 10 μm; and
    thermally tempering the glass substrate with the UV blocking coating thereon, wherein the second coating enables the first coating to remain substantially crack-free during and/or after thermal tempering and/or heat treatment.

2. The method of claim 1, wherein the photomonomer and/or photopolymer comprises a UV-curable acrylate.

3. The method of claim 1, further comprising forming a low emissivity coating on a glass substrate, the low-emissivity coating comprising at least one infrared (IR) reflecting layer, a first dielectric layer, and a second dielectric layer, wherein the IR reflecting layer is located between at least the first and second dielectric layers, wherein the UV blocking coating is provided over the low-emissivity coating, and wherein the second wet coating is provided over the UV blocking coating.

4. The method of claim 1, wherein the first wet coating further comprises a caprolactone polyol.

5. A method of making a coated article, the method comprising:
    applying a first wet coating comprising a silane, a compound of cerium, and a compound of titanium on the glass substrate,
    at least partially curing the wet coating to form a UV blocking coating on the glass substrate, the UV blocking coating consisting essentially of:
    titanium oxide: from about 20-25% by mole
    cerium oxide: from about 20-25% by mole
    silicon oxide: from about 30-60% by mole,
    wherein the UV blocking coating has a thickness ranging from about 0.75 to 1.2 μm;
    applying a second wet coating comprising a heat-curable polymer or UV-curable polymer on the glass substrate over the UV blocking coating to form a coated article; and
    curing the second wet coating through exposure to radiation, wherein the second coating has a thickness of from about 5 to 10 μm;

heat treating the coated article, wherein the second coating enables the first coating to remain substantially crack-free during and/or after heat treatment.

6. The method of claim 5, wherein the UV blocking coating together with the cured second coating has a refractive index (n) of from about 1.66 to 1.96.

7. The method of claim 1, wherein the photomonomer and/or photopolymer comprises a UV-curable epoxy.

8. The method of claim 1, wherein the UV blocking coating is a single layer.

9. The method of claim 1, wherein the second wet coating comprising the photomonomer and/or photopolymer comprises an organic polymer and is an outermost layer of the coated article.

\* \* \* \* \*